April 19, 1927.
H. KETTLER
RECENTERING DEVICE
Filed Feb. 13, 1926    2 Sheets-Sheet 2
1,625,032
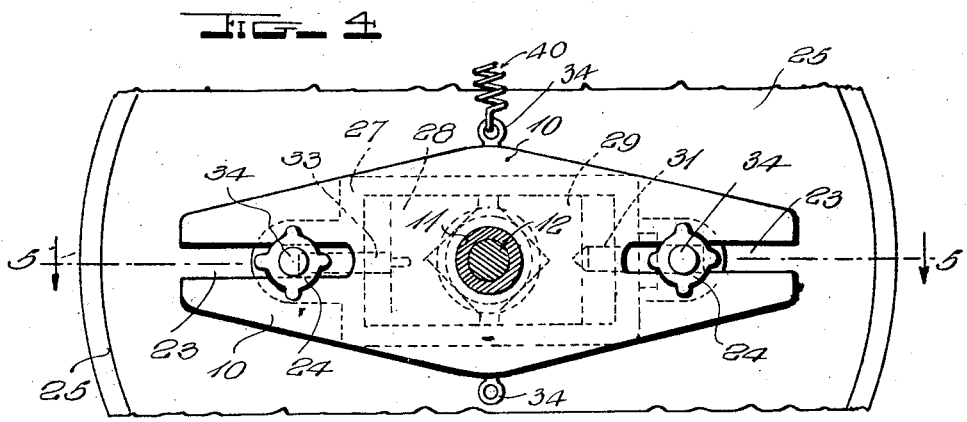
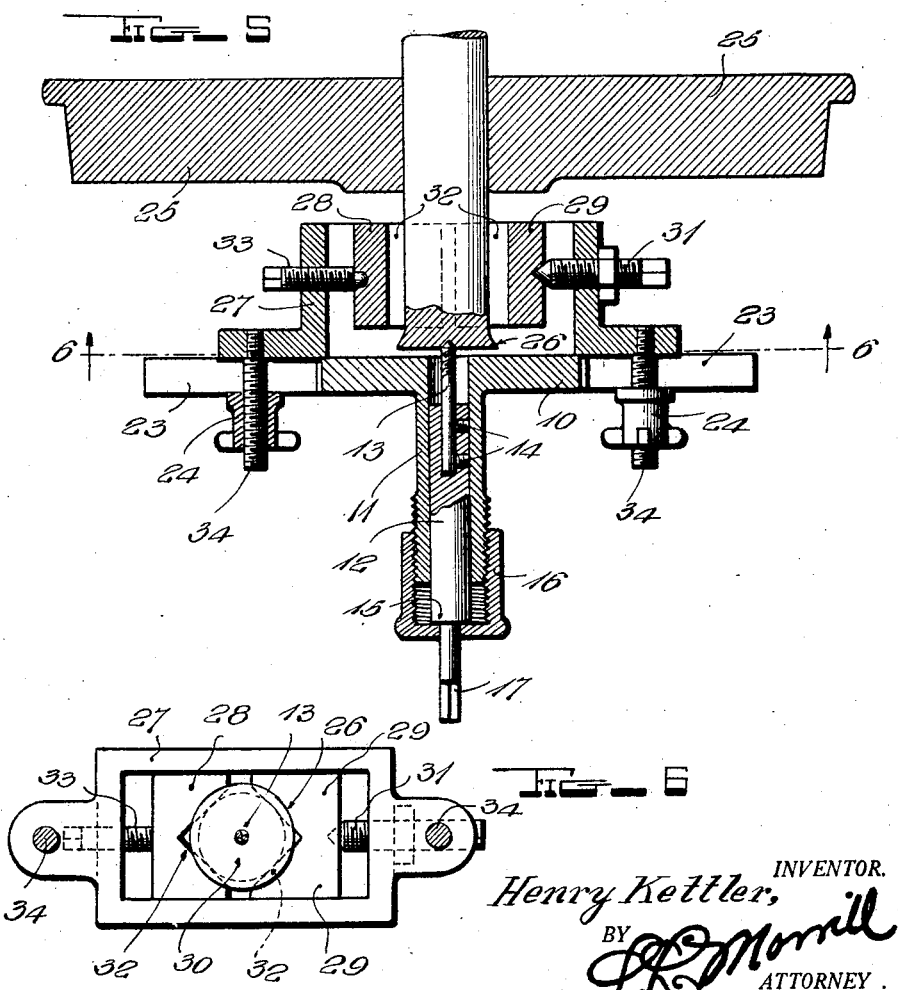
INVENTOR.
Henry Kettler,
BY
ATTORNEY.

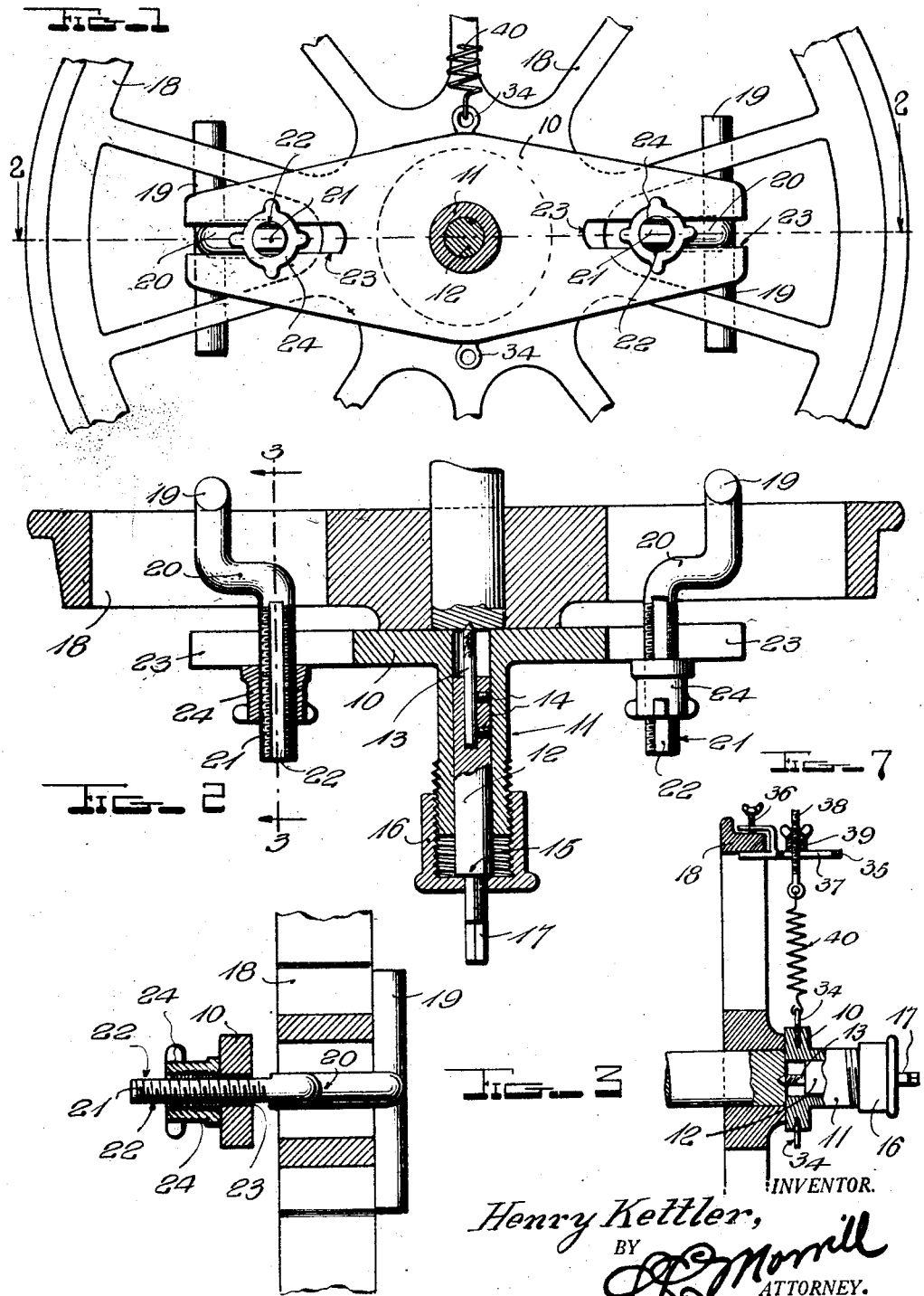

Patented Apr. 19, 1927.

1,625,032

UNITED STATES PATENT OFFICE.

HENRY KETTLER, OF DETROIT, MICHIGAN.

RECENTERING DEVICE.

Application filed February 13, 1926. Serial No. 88,091.

This invention relates to re-centering devices and has for an object to provide a device especially adapted for re-centering the axle of railway rolling stock when the original centering has become obliterated or otherwise mutilated.

A further object of the invention is to provide a re-centering device which will operate in conjunction both with the drivers of a locomotive and the truck wheels, either of a locomotive or of a car as required and which will properly position the center in the axle for turning or other employment.

A further object of the invention is to provide a re-centering device which may be readily applied to the wheel or axle as disclosed by one man and operated by one man to complete the center indentation, thereby eliminating one or more men from the operation as usually practiced.

A further object of the invention is to provide improved means for resiliently supporting the re-centering device temporarily while effecting a permanent attachment.

With these and other objects in view, the invention comprises certain novel parts, elements, units, combinations, constructions and functions as disc'osed in the drawings together with mechanical and functional equivalents thereof as will be hereinafter more fully described and claimed.

In the drawings:

Figure 1 is a view of the device in side elevation as applied to a locomotive wheel.

Figure 2 is a sectional view taken on line 2—2 of Figure 1.

Figure 3 is a sectional view taken on line 3—3 of Figure 2.

Figure 4 is a view in side elevation of the device as applied to the axle of a truck wheel.

Figure 5 is a diametrical sectional view taken on line 5—5 of Figure 4.

Figure 6 is a view of the clamp for attaching to the axle of a truck shown in side elevation and taken on line 6—6 of Figure 5.

Figure 7 is a diametrical sectional view through a driver on a reduced scale showing the resilient means for supporting the re-centering device.

Like characters of reference indicate corresponding parts throughout the several views.

It is well known that the wheels of the rolling stock of railways require at times turning down to eliminate flat wheels or for other purposes, or that it is necessary to mount the wheels and axles in a lathe or similar machine for other purposes. As originally manufactured, the axles of these wheels are provided with center indentations, but in use these indentations become obliterated or mutilated and, when it is necessary to machine the organization, such centerings are useless. The present invention is intended as a one man, convenient and economical means for re-centering the axles for such purposes as may be required. The centering device comprises a plate 10 having a sleeve 11 in which is fitted a boring tool 12 carrying a bit 13 of any desired type, it being understood that the particular bit shown in the drawing is no limitation upon the invention and that any other bit found necessary or desirable may be substituted therefor, being held in the boring implement 12 by means of set screws 14.

To feed the boring tool and bit, the tool is provided with a shoulder 15 and a screw cap 16 threaded upon the end of the sleeve 11 bears upon said shoulder. Said cap may be turned by hand or the use of a tool to feed the boring tool 12. The rotation of the bit and tool is accomplished by a crank or other implement upon the squared end 17.

It is necessary and desirable to position this plate relative to the axle so that the bit 13 may engage the exact center of said axle. At Figures 1, 2 and 3, the plate is shown attached to a conventional locomotive wheel indicated at 18 by means of tension screws. These tension screws are provided with T-heads 19 which span interva's between two of the spokes of the driver and preferably provided with an offset 20 so that the threaded portion 21 is nearer the center than the heads 19. The threaded portions 21 are preferably flattened or mutilated upon opposite sides as indicated at 22 to fit into the slots 23 formed in the plates 10. This is for the purpose of preventing the tension members from turning and to retain the T-heads substantially perpendicular to the slots. Nuts 24 are employed upon the threaded portions 21 to fasten the plate 10 rigidly against the face of the driver.

As truck wheels, whether an engine truck or a car truck, are not ordinarily provided with spokes, other means for attaching the plate is provided for cooperating with truck shafts. Truck shafts are ordinarily extended beyond the wheels indicated at 25 to fit in bearings on boxes and ordinarily also the outer ends of these shafts are upset or enlarged as indicated at 26 in Figures 5 and 6. A frame 27 is provided having sliding blocks 28 and 29 for fitting over and upon the extended end 30 of the shaft. Tension means, as the screw 31, is provided for forcing these blocks into clamping engagement with the shaft as indicated at Figures 5 and 6, V-shaped notches 32 being formed in these blocks to fit various sizes of axles. Opposed to the tension screw 31 is a positioning member 33 which may or may not be a tension screw, it being wholly unimportant whether both or only one of the blocks 28 and 29 are moved in the process of clamping upon the shaft, as the slots 23 in the plate 10 permit the adjustment of this plate to position the bit 13 at the exact center. The block 27 is provided with screw-threaded studs 34 upon which the nuts 24 operate to clamp the plate 10 in position against the block 27.

In either embodiment of the invention, the plate 10 is positioned relative to the axle so that the bit 13 is properly centered, whereupon by the rotation of the boring device 10 fed forward by the rotation of the collar 16, the bit is forced to drill into the center of the axle to reproduce the centering indentation necessary or desirable for properly maintaining the axle and wheel.

For enabling one man to properly position the device relative to a driver, a resilient supporting means is provided which comprises an eye 34 in the side of the plate 10. So that this plate 10 may be used either side up, the eye 34 may, if found desirable, be duplicated upon opposite sides as indicated.

A bracket 35 is provided which is attached to the rim of the driver by means of a set screw or other clamping means 36 as indicated more particularly at Figure 7. This bracket 35 is provided with a slot 37 through which extends a threaded eye bolt 38 carrying a winged nut or other means for exerting tension thereon, indicated at 39. Between this eye bolt 38 and the eye 34 a spring 40 is inserted so that, by exerting tension upon the eye bolt 38 by the nut 39, the device may be properly supported while being attached by use of the T-head attaching members 19. The eye bolt 38 is also made of considerable length, as indicated at Figure 7, so that it may properly operate in conjunction with drivers of different diameters. The slot also permits the device to be moved to or from the point of attachment to accommodate hubs or extending shafts as occasion may make necessary. In operating this temporary supporting device, the bracket is attached to the rim as indicated at Figure 7 and the eye bolt 38 adjusted to the proper diameter to support the plate 10 at approximately the correct position. The fastening means 19 are thereupon placed in position and by reason of the resiliency and yielding of the spring 40, the plate may be properly and accurately adjusted and rigidly secured.

What I claim to be new is:

1. A re-centering device comprising a plate having a central opening and slots disposed radially relative to the central opening, a sleeve erected perpendicular upon said plate and having an opening registering with the opening in the plate, a boring tool rotatably mounted within the sleeve, a feed collar threaded upon the end of the sleeve, tension screws extended through the slots and provided with means to prevent rotation of the screws in said slots, T-heads formed upon said screws at the ends opposite the nuts, and an offset formed intermediate the threaded end and the T-head.

2. A re-centering device comprising a plate having a central opening and slots disposed radially relative to the central opening, a sleeve erected perpendicular upon said plate and having an opening registering with the opening in the plate, a boring tool rotatably mounted within the sleeve, a feed collar threaded upon the end of the sleeve, tension screws extended through the slots and provided with means to prevent rotation of the screws in said slots, T-heads formed upon said screws at the ends opposite the nuts, an offset formed intermediate the threaded end and the T-head, a bracket provided with means for attaching adjacent the perimeter of the wheel, a spring interposed between the plate and said bracket, and means to adjust the spring relative to the bracket to yieldingly raise and lower the plate.

In testimony whereof I affix my signature.

HENRY KETTLER.